May 16, 1939.  R. H. GODDARD  2,158,180
GYROSCOPIC STEERING APPARATUS
Filed Nov. 9, 1936  3 Sheets-Sheet 1
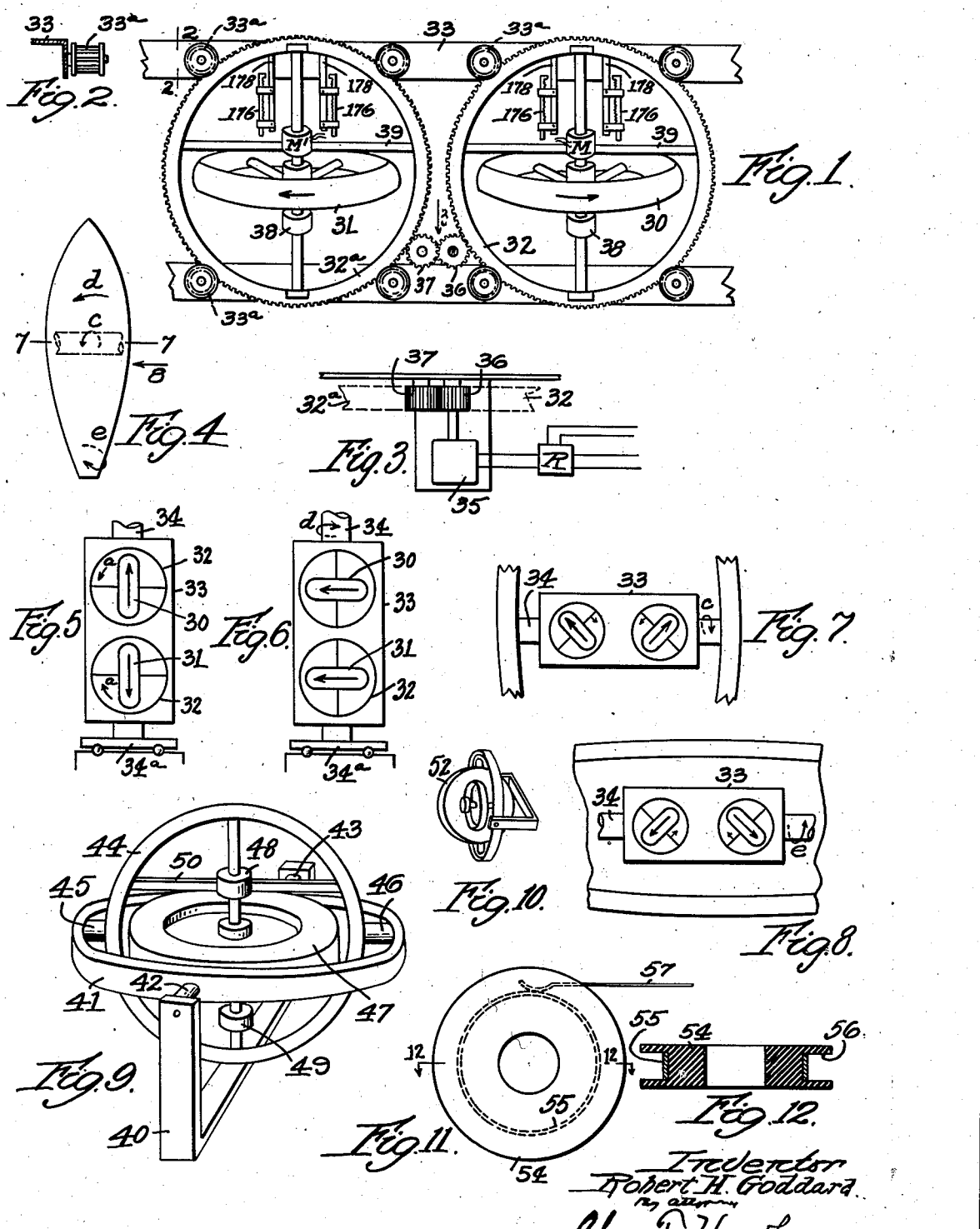

May 16, 1939. R. H. GODDARD 2,158,180
GYROSCOPIC STEERING APPARATUS
Filed Nov. 9, 1936 3 Sheets-Sheet 2
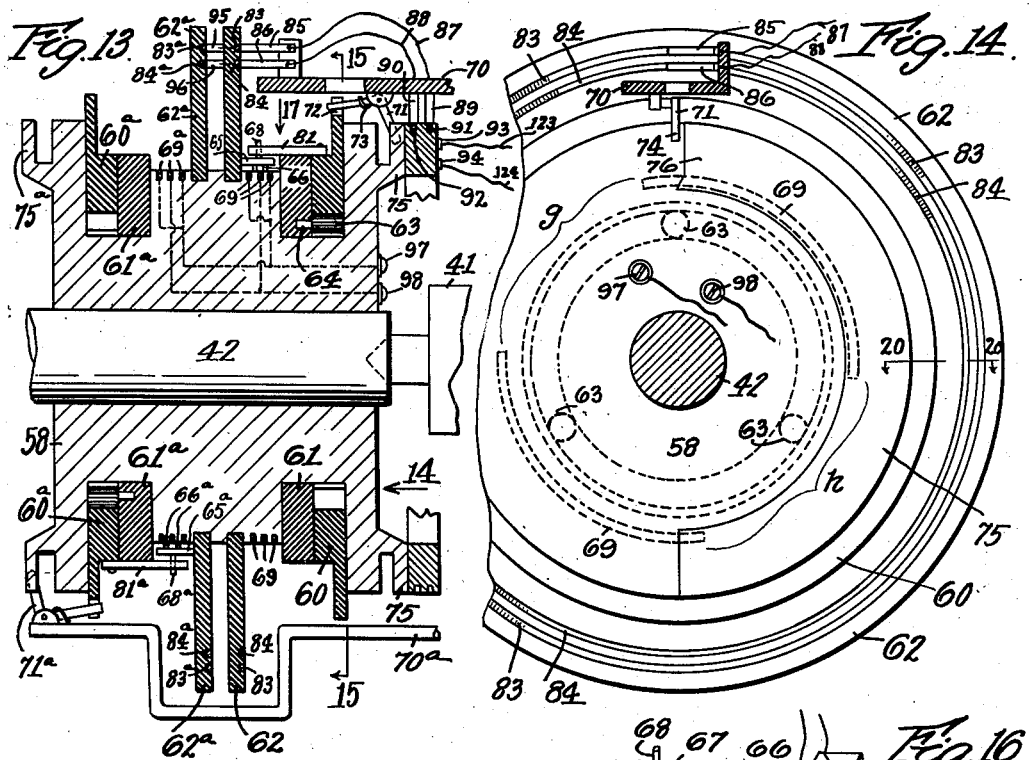
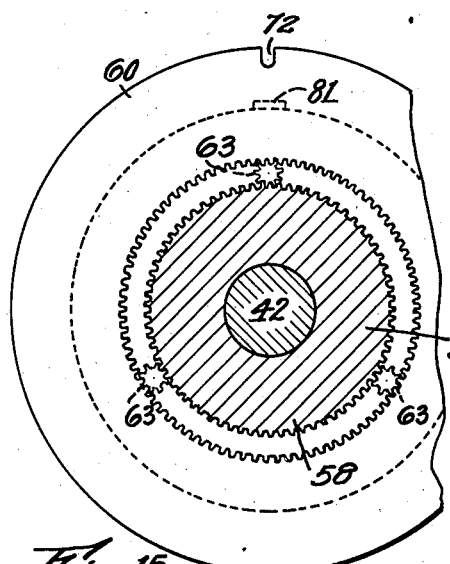
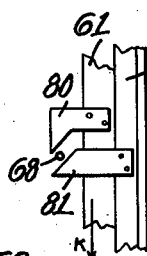
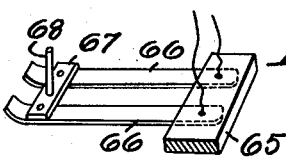
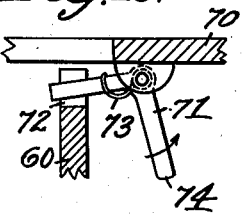
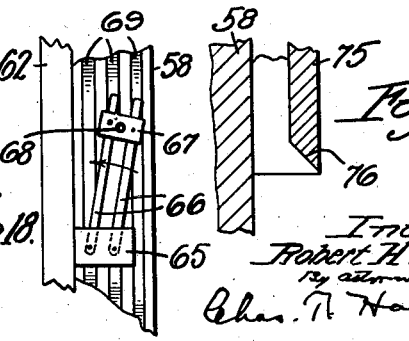

May 16, 1939. R. H. GODDARD 2,158,180
GYROSCOPIC STEERING APPARATUS
Filed Nov. 9, 1936 3 Sheets-Sheet 3
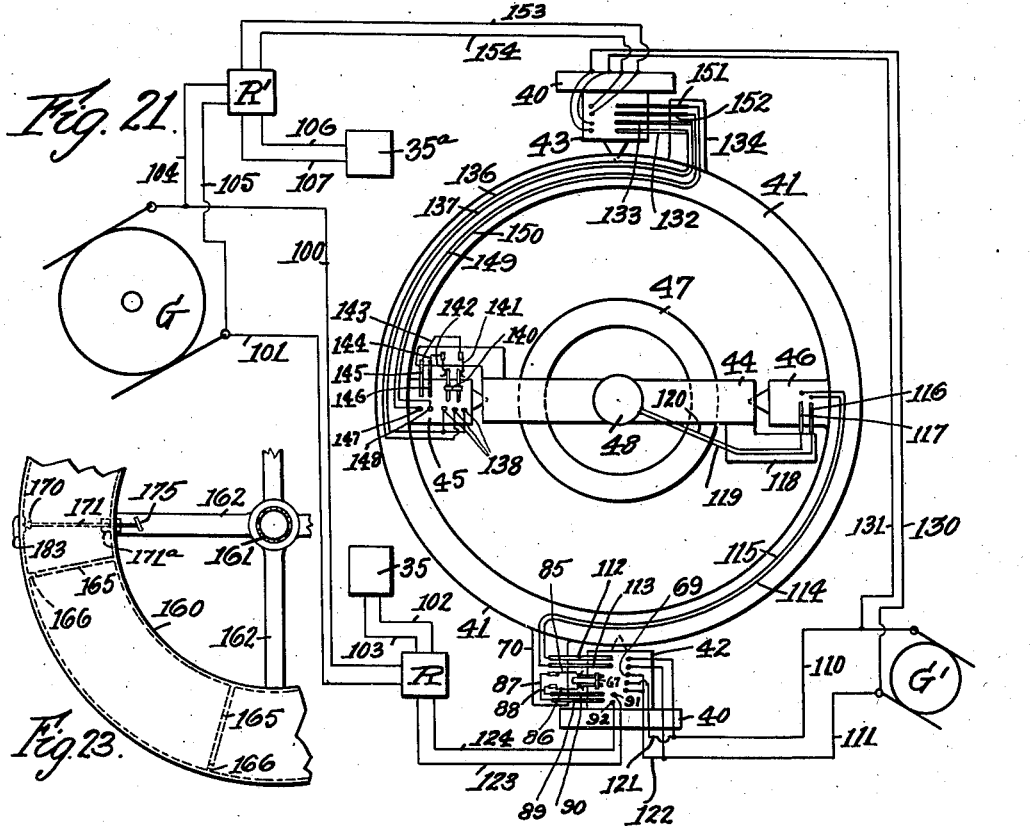
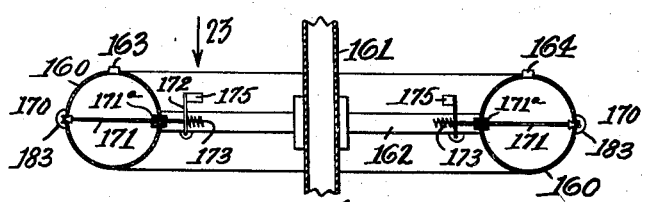
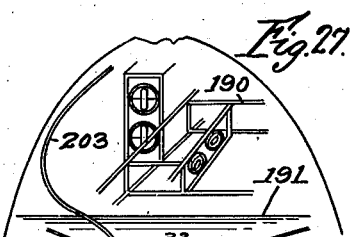
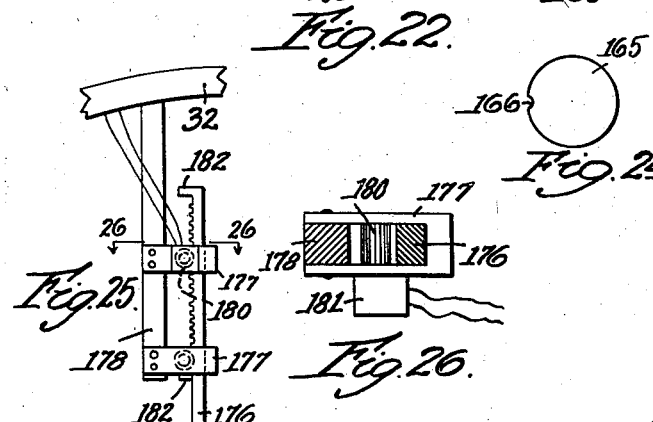
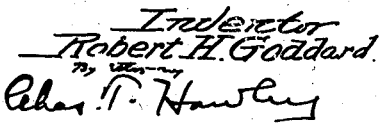
Inventor
Robert H. Goddard Patented May 16, 1939

2,158,180

UNITED STATES PATENT OFFICE 2,158,180

GYROSCOPIC STEERING APPARATUS

Robert H. Goddard, Roswell, N. Mex.

Application November 9, 1936, Serial No. 109,964

5 Claims. (Cl. 244—79)

This invention relates to means for steering or directing the flight of aircraft such as rockets, rocket planes, airplanes or dirigibles.

It is the general object of my invention to provide gyroscopic steering apparatus for such aircraft, which may be entirely enclosed within the craft and which embodies no wings, vanes or other devices projecting outward into the surrounding air or slip stream or into a rocket blast.

A further object of the invention is to provide improved steering means for aircraft which will be operative regardless of the density of the air through which the craft is moving.

To the attainment of these and other objects, my invention relates to improved gyroscopic steering apparatus for directing the flight of aircraft, and to improved control mechanism, preferably gyroscopic, for said steering apparatus.

My invention further relates to arrangements and combinations of parts which will be hereinafter described and more particularly pointed out in the appended claims.

A preferred form of the invention is shown in the drawings, in which

Fig. 1 is a perspective view of a gyroscopic steering unit;

Fig. 2 is a detail sectional view, taken along the line 2—2 in Fig. 1;

Fig. 3 is a detail plan view, looking in the direction of the arrow 3 in Fig. 1;

Fig. 4 is a diagrammatic view of an aircraft;

Figs. 5 and 6 are diagrammatic views illustrating the operation of the gyroscopic steering unit which controls the direction of flight in a horizontal plane, as indicated by the arrow $d$ in Fig. 4;

Fig. 7 is a sectional view, taken along the line 7—7 in Fig. 4 and showing the gyroscopic steering unit which controls the tilting of the craft in a vertical plane, as indicated by the arrow $c$ in Fig. 4;

Fig. 8 is a side elevation looking in the direction of the arrow 8 in Fig. 4, and shows a gyroscopic steering unit for controlling rotation of an aircraft about its longitudinal axis, as indicated by the arrow $e$ in Fig. 4;

Fig. 9 is a perspective view of a double-acting pilot gyroscope automatically controlling two gyroscopic steering units, such as the units which control the vertical tilting of the craft and the direction thereof in a horizontal plane;

Fig. 10 is a perspective view of a second pilot gyroscope effective to control angular displacement of the craft around the longitudinal axis thereof;

Fig. 11 is a view of a commutator for one of the gimbal shafts of a pilot gyroscope;

Fig. 12 is a detail sectional view, taken along the line 12—12 in Fig. 11;

Fig. 13 is a sectional elevation of a special rotary switch for a pilot gyroscope;

Fig. 14 is an end view thereof, partly in section, looking in the direction of the arrow 14 in Fig. 13;

Fig. 15 is a sectional end elevation, taken along the line 15—15 in Fig. 13;

Fig. 16 is a perspective view of a reversing switch element;

Fig. 17 is a detail view of certain starting switch control parts, looking in the direction of the arrow 17 in Fig. 13;

Fig. 18 is a plan view of the reversing switch, with associated parts in operative relation;

Fig. 19 is an enlarged side elevation of a locking device;

Fig. 20 is a detail sectional view, taken along the line 20—20 in Fig. 14;

Fig. 21 is a wiring diagram for one of the pilot gyroscopes;

Fig. 22 is a sectional view of a preferred form of rotating gyroscope element;

Fig. 23 is a partial plan view, looking in the direction of the arrow 23 in Fig. 22;

Fig. 24 is a side elevation of a partition member used in the gyroscope construction shown in Figs. 22 and 23;

Fig. 25 is a side elevation of certain valve control mechanism;

Fig. 26 is an enlarged sectional view, taken along the line 26—26 in Fig. 25;

Fig. 27 is a diagrammatic view illustrating one form of installation of my improved gyroscopic steering apparatus; and Fig. 28 is an enlarged detail sectional view to be described.

In the development of my improved steering apparatus, I make use of the known principle that a heavy ring rotating in a plane perpendicular to the axis of a supporting structure will produce a reacting force tending to rotate the supporting structure, which rotation will actually take place if the supporting structure is itself mounted for free rotation.

This principle, while previously known, has not been directly adaptable to the control of aircraft, as a rotating ring of sufficient mass to be effective would react undesirably and irregularly with any outside force acting on the craft, due to the gyroscopic force of the heavy rotating ring. A serious "wabbling" action in the craft would result.

I avoid these undesirable results by using a pair of rotating elements in each gyroscopic steering unit, which elements rotate in opposite directions about axes which are normally parallel. The two elements thus rotating in opposite directions in the same plane neutralize each other and when in this position have no effect on the movements of the aircraft.

Such an arrangement is indicated diagrammatically in Fig. 5, in which rotating elements 30 and 31 are mounted in gimbals 32 in a frame 33, supported on a standard 34 mounted on an anti-friction bearing 34a. So long as the parts are in the position shown in Fig. 5, the frame 33 and standard 34 will remain at rest. If, however, the gimbals are moved simultaneously in opposite directions as indicated by the arrows $a$ in Fig. 5 to bring the rotating elements 30 and 31 to the positions shown in Fig. 6, in which they rotate in the same direction about a common axis, an annular momentum will be produced by the rotating elements and a corresponding reaction on the supporting frame 33 and standard 34 will produce an angular movement thereof in the direction of the arrow $d$ in Fig. 6, this angular reaction being a maximum when the gimbals 32 are rotated 90° as indicated in Fig. 6.

While the maximum reaction is caused by 90° displacement, any angular displacement of the two gimbals and supported rotated elements simultaneously in the opposite directions of the arrows $a$ in Fig. 5 will produce a similar angular reaction, which reaction increases with the angle of displacement.

If it is now assumed that the frame 33 and post 34 are fixed in vertical position in an aircraft such as is shown diagrammatically in Fig. 4, the reaction of the displaced gyroscopic elements will tend to turn the aircraft in a horizontal plane, as indicated by the arrow $d$ in Figs. 4 and 6. If the gimbals and supported elements are displaced in a direction opposite to the arrows $a$ in Fig. 5, the reaction will be reversed and the craft will be turned in a direction opposite to the arrow $d$ in Fig. 4.

If a similar gyroscopic unit is mounted transversely in the aircraft along the line 7—7 in Fig. 4 and as indicated in Fig. 7, displacement of the gyroscope elements from normal and neutral position to the position shown in Fig. 7 will occasion tilting of the aircraft or angular displacement thereof in a vertical plane as indicated by the arrows $c$ in Figs. 4 and 7. The tilting movement will be in the opposite direction if the displacement of the rotating elements is reversed as previously explained. It will be understood that the terms "horizontal" and "vertical" are used in a relative sense only and not in a strictly technical way.

If a third gyroscopic steering unit is secured in the aircraft in position along the longitudinal axis of the craft as indicated in Fig. 8, angular displacement of the rotating elements will effect an angular reaction which will tend to displace or spin the craft angularly about its longitudinal axis, as indicated by the arrow $e$ in Figs. 4 and 8.

It is thus possible to control the movement of an aircraft in vertical and horizontal planes and also about its own axis by the provision of three pairs of rotating gyroscope elements operating in the three positions above described. Each steering unit may be manually controlled to produce the desired changes in direction, and the flight of the craft may thus be effectively directed without using any elements projecting outward from the craft and without depending in any way upon reaction with the surrounding atmosphere or a rocket blast.

A gyroscopic steering unit as above described is shown in detail in Figs. 1, 2 and 3. The gyroscope elements 30 and 31 previously described are pivotally mounted in gimbals 32 and 32a, supported in a frame 33 secured in a desired position in the aircraft. The gimbals 32 and 32a are provided with external gear teeth and are mounted for rotation on rolls or loose pinions 33a. A motor 35 (Fig. 3) drives a pinion 36 which engages the gimbal 32 and the pinion 36 meshes with a pinion 37 which engages and drives the second gimbal 32a.

Motors M and M' are provided for rotating the gyroscope elements 30 and 31, and corresponding rotating counterbalances 38 are provided. The non-rotating parts of the motors M and M' are supported on cross rods or braces 39 in the gimbals 32 and 32a. The wiring connections to the motors M and M' will be hereinafter described.

The motor 35 is of the reversing type and constitutes means by which the gimbals 32 and 32a may be simultaneously rotated in either direction and to any desired extent but always in opposite angular directions.

If a pair of gyroscope elements, as 30 and 31, are moved out of their normal or inoperative relation by turning the supporting gimbals, the directing force developed by the gyroscopes will divert the aircraft from its prior path of travel and will continue to divert or turn the craft further and further from its prior path as long as the gyroscope elements remain out of normal or balanced inoperative position. When said elements are returned to such balanced position, the craft will continue in its new direction, unless diverted therefrom by some external force.

While my improved control apparatus in this simple form may thus be used to steer an aircraft manually in a desired path of travel, the invention is more broadly useful when associated with control devices to be described by which an aircraft, when diverted from its path of travel by external force, will be automatically returned to its original path. Throughout this specification it is of course assumed that the external forces act along lines which do not pass through the center of gravity of the aircraft, or in other words that they exert moments of force, or tendency to produce rotation.

For this purpose I provide pilot gyroscopes such as are shown in Figs. 9 and 10.

In Fig. 9 I have shown a double-acting pilot gyroscope adapted to control motors, as 35, to correct deviations from the path of travel in two different planes. This pilot gyroscope comprises a frame 40 fixed in position in the aircraft and supporting a gimbal 41 on gimbal bearings 42 and 43. A second gimbal 44 is mounted within the gimbal 41 on gimbal bearings 45 and 46. A gyroscope element 47 of substantial weight is rotatably mounted in the gimbal 44 and is provided with a driving motor 48 and a rotating counterweight 49, substantially as previously described with reference to the apparatus shown in Fig. 1. The non-rotating parts of the motor 48 are mounted on a cross brace 50 carried by the gimbal 44.

Whenever the aircraft is diverted from its normal course in either of the two directions controlled by the gyroscope element 47, said element will continue to rotate in its normal plane, but the supporting gimbals 44 and 41 will be displaced relative to each other and also relative to the fixed frame 40, and by suitable electrical connections they will control the operation of motors, as 35, which rotate the gimbals of the directing or steering gyroscopes previously described.

The second pilot gyroscope 52 shown in Fig. 10 is substantially the same as that shown in Fig. 9 but the electrical connections thereto are simplified, as this second pilot gyroscope corrects flight about one axis only.

In Figs. 11 and 12 I have shown a type of ring commutator which may be conveniently used to conduct current from the frame 40 to the gimbal 41 or from the gimbal 41 to the gimbal 44. For this purpose I provide circular blocks 54 of insulating material adapted to be mounted on the gimbal bearings and each having a brass or other conducting ring 55 mounted in the bottom of a groove 56. A contact member, such as a brass strip 57, engages the ring 55 and is supported by the associated moving part or gimbal so as to move along the groove 56 as the parts are angularly displaced, thus maintaining continuous contact. The rings 55 and strips 57 are connected to suitable conducting wires, as will be hereinafter described.

When my improved steering gyroscopic apparatus is automatically controlled to maintain a directed flight, it is necessary to displace the gimbals in one of the gyroscope frames, as 33, in a selected direction to offset a divergence in flight caused by external force and to prevent further divergence in the undesired direction. It is then necessary to produce an angular correction of the path of flight in the opposite direction to restore the original direction of flight. It also is particularly necessary to prevent overcorrection, which would cause an irregular, wabbling or oscillating flight.

For such automatic control, I provide mechanism to be now described which will cause a motor, as 35, to increasingly displace associated gyroscope elements until the deviating external force is neutralized. The flight-correcting gyroscopes continue to rotate in their new displaced relation until the craft has been partially restored to its original position, after which the controlling motor, as 35, will be operated in the reverse direction to gradually move the flight-correcting gyroscopes toward their original position.

After the correction, the axes of the flight-correcting gyroscopes will make such an angle with their original directions as to give an angular momentum equal and opposite to that produced by the external force. Over a long flight, however, these external forces, being in random directions, will tend to neutralize each other, so that the axes of the gyroscopes will remain approximately in their initial directions.

For such control, I provide a delayed action switch apparatus shown in detail on Sheet 2 of the drawings. A block 58 (Fig. 13) of insulating material is fixed on the pilot gyroscope frame 40 concentric with the pivot bearing 42 of the gimbal 41. A plurality of rings 60 and 60ª, 61 and 61ª and 62 and 62ª are rotatably mounted on the block 58.

The rings 60 and 60ª are provided with internal gear teeth, meshing with pinions 63 which also engage fixed external gear teeth on the block 58, and which are mounted on pivot studs 64 fixed in the adjacent ring 61 or 61ª. Rotation of one of the rings 60 or 60ª will cause simultaneous rotation of the corresponding ring 61 or 61ª in the same direction but at one-half the speed, due to the well-known properties of planetary gears.

The rings 62 and 62ª are loose on the block 58 but are held frictionally from unrestrained movement thereon. The ring 62 has a projection 65 (Fig. 18) on which are pivotally mounted a pair of contact fingers 66 forming a double pole switch 67 having an operating pin 68 secured thereto near the free ends of said fingers.

The contact fingers 66 are adapted to contact with contact rings 69 mounted on the block 58 and concentric therewith. The rings 69 are segmental only, and the ends of the rings are separated by a space indicated by the letter $g$ in Fig. 14.

The switch 67 may be thrown from right to left as viewed in Fig. 18, and in both positions will make contact with the middle ring 69 and with one or the other of the outside rings. The outside rings are connected together as indicated in Fig. 13, so that movement of the switch from side to side will reverse the direction of current flow in the circuits controlled thereby.

The ring 62ª is similarly provided with a projection 65ª supporting a double pole switch 67ª having an operating pin 68ª and having a pair of contact fingers 66ª adapted to engage selected segmental rings 69ª having their ends spaced apart as indicated at $h$ in Fig. 14.

An arm 70 (Figs. 13 and 14) is attached to the gimbal which is angularly displaceable relative to the frame 40 and block 58. The arm 70 is provided with a bell crank 71 having a laterally extended portion normally seated in a slot 72 (Fig. 15) in the periphery of the ring 60, so that the ring 60 is normally held in fixed angular relation to the arm 70 and its supporting gimbal.

A spring 73 (Fig. 19) normally holds the parts yieldingly in the described relation and with the depending portion 74 of the bell crank 71 in alignment with a segmental ring 75 (Fig. 20) fixed on the end of the block 58. When the arm 70 and bell crank 71 are rotated in a direction away from the end of the fixed segmental ring 75, the parts maintain the relation shown in Figs. 13 and 19 and the ring 60 is moved with the arm 70.

If the arm 70 is displaced in the opposite direction, however, the depending arm 74 engages a beveled end surface 76 (Fig. 20) of the ring 75 and is swung clockwise out of the slot 72, thus causing no movement of the ring 60.

When the parts are thus operated, however, a corresponding bell crank 71ª (Fig. 13) engages and rotates the ring 60ª in a direction opposite to the previously described movement of the ring 60. The bell crank 71ª is mounted on an arm 70ª which is fixed to the same gimbal which supports the arm 70, and the bell crank is controlled in its operation by a fixed ring 75ª, all as previously described.

The ring 61 (Fig. 17) carries a cam arm 80 fixed thereto and projecting laterally therefrom to engage the operating pin 68 of the double pole switch 67. When the gimbal which supports the arm 70 is displaced angularly in the direction indicated by the arrow $k$ in Fig. 17, the rings 60 and 61 will be similarly displaced, although at different speeds, and the arm 80 will engage and shift the pin 68 to the position shown in Fig. 18.

A second cam arm 81 is mounted on the ring 60 and when moved in the reverse direction will shift the switch 67 to its opposite working position. Similar cam arms 80ᵃ and 81ᵃ are associated with the rings 60ᵃ and 61ᵃ and similarly engage the pin 68ᵃ and operate the switch fingers 66ᵃ.

The contact fingers 66 of the switch 67 are connected to concentric bands 83 and 84 on the rings 62, which bands are engaged by contact strips or brushes 85 and 86, connected by wires 87 and 88 to brushes 89 and 90 which engage commutator rings 91 and 92 mounted on an extension of the block 58 and connected to binding posts 93 and 94.

Brushes 95 and 96 are mounted on the ring 62 and are connected to the bands 83 and 84, and said brushes engage corresponding bands 83ᵃ and 84ᵃ on the ring 62ᵃ, which bands are connected respectively to the two contact fingers 66ᵃ of the lower switch. The outside segmental rings 69 and 69ᵃ are connected to a terminal 97 on the block 58, and the middle rings 69 and 69ᵃ are similarly connected to a second terminal 98.

The operation of the delayed action switch mechanism above described is as follows:

When the gimbal supporting the arm 70 is displaced in the direction of the arrow k in Fig. 17, the ring 60 is similarly displaced and the ring 61 is moved in the same direction but for one-half the distance. Such movement causes the cam arm 80 to shift the switch 67 to the position shown in Fig. 18. After having shifted the switch, the arm 80 continues to push against the pin 68, thus rotating the ring 62 with the arm 80.

The switch fingers 66 normally rest on the non-conducting portion g of the block 58 between the ends of the segmental rings 69, but as soon as the rotation of the ring 62 is begun, the fingers engage the selected rings 69 and complete a motor control circuit which will be hereinafter described.

The motion of the arm 70 and ring 60 and the half speed motion of the rings 61 and 62 continue until the corresponding steering gyroscope has equalized the deviating force and thus stopped the relative angular movement of the gimbal which supports the arm 70.

The steering gyroscope motor will continue to operate, still further displacing the steering gyroscopes to produce a counter-rotation of the aircraft and a like rotation of the pilot gyroscope gimbal supporting the arm 70. This will rotate the ring 60 in the opposite direction, carrying with it the ring 61 at half speed, but the ring 62 supporting the switch 67 will be held frictionally in fixed position until the pin 68 is engaged by the cam arm 81.

As the arm 81 has traveled twice as fast and twice as far as the pin 68 in the initial direction, the arm 81 will not reverse the switch 67 until half of its return movement has been completed. Thereupon the switch 67 will be reversed and will then be returned to initial position along with the ring 62.

When the switch is reversed, the control circuit of the motor which shifts the steering gyroscope is reversed and the gyroscope elements are gradually brought back to initial inoperative relation, this result being accomplished at the same time that the ring 62 is returned to its original position and the control circuit is broken by separation of the contact fingers 66 from the segmental rings 69.

If the initial movement of the arms 70 and 70ᵃ is in the opposite direction, the corresponding parts at the left in Fig. 13 will be similarly operated to correct a deviation in the opposite direction.

The electrical circuits and connections through which the several gyroscopes are rotated and through which the pilot gyroscopes control the steering gyroscopes are shown diagrammatically in Fig. 21.

The main generator or source of power G is connected through wires 100 and 101, a relay R and wires 102 and 103 to a motor, as 35, (Fig. 3) which rotates the gimbal frames 32 and 32ᵃ of the steering gyroscope shown in Fig. 1. The generator G is also connected through additional wires 104 and 105, a relay R' and wires 106 and 107 to a second motor 35ᵃ which rotates the gimbal frames of a second steering gyroscope.

A second or auxiliary generator G' is connected through wires 110 and 111 to commutator rings on the gimbal bearing 42 of the double acting pilot gyroscope shown in Fig. 9. Brushes 112 and 113 are mounted on the arm 70 of the gimbal 41 and are connected by wires 114 and 115 to commutator rings on the gimbal bearing 46, which rings are engaged by brushes 116 and 117 mounted on an arm 118 on the inner gimbal ring 44. The brushes 116 and 117 are connected by wires 119 and 120 to the motor 48 which drives the constantly rotating gyroscope element 47. Through these connections the generator G' is continuously connected to the motor 48 in every position of the pilot gyroscope and its supporting gimbals.

The generator G' is also connected through branch wires 121 and 122 to the segmental rings 69 previously described, which rings are selectively engaged by contact fingers of the switch 67 to complete a control circuit through the brushes 85 and 86, wires 87 and 88, brushes 89 and 90, commutator rings 91 and 92 and wires 123 and 124 to the relay R previously described. Through these connections displacement of the gimbal 41 from its normal relation to the frame 40 causes the relay R to be operated in such manner as to connect the generator G to the motor 35 and thus cause rotation thereof in one direction.

For the sake of clearness, the connections through the segmental rings 69ᵃ and switch 67ᵃ are omitted, these being duplicates of the circuits previously described and being connected to cause the relay R to complete reverse connections between the generator G and the motor 35, so that the motor will operate in the opposite direction.

The connections by which displacement of the inner gimbal 44 controls the relay R' and motor 35ᵃ of a second steering unit will now be described.

The generator G' is connected by wires 130 and 131 to commutator rings on the fixed gimbal bearing 43, and these rings are engaged by brushes 132 and 133 on an arm 134 on the gimbal 41, corresponding to the arm 70 previously described. The brushes 132 and 133 are connected by wires 136 and 137 to segmental contact rings 138 corresponding to the rings 69 previously described.

These rings 138 are selectively engaged by a double pole switch 140, connected through brushes 141 and 142 and wires 143 and 144 to brushes 145 and 146 which engage commutator rings 147 and 148 on the gimbal bearing 45, and which rings are connected by wires 149 and 150 to brushes 151 and 152 on the arm 134 previously described. These brushes are connected through collector rings on the gimbal bearing 43 to wires 153 and 154 which lead to the relay R'.

When the inner gimbal 44 is displaced from its normal position in either direction, connection will be completed through the switch 140 to selected segmental rings 138 so that the relay R' will be energized to connect the generator G to rotate the motor 35ª in the indicated direction. It will be understood that a second switch corresponding to the switch 140 and a second set of segmental rings corresponding to the rings 138 will be provided to indicate displacement of the gimbal 44 in the opposite direction.

With the connections described, it will be evident that the motors 35 and 35ª which respectively control two different steering gyroscopes, will be operated in accordance with the displacement of the gimbals 41 and 44 respectively with reference to the rotating gyroscope element 47.

The connections from the single acting pilot gyroscope shown in Fig. 10 are substantially the same as the connections through which the motor 35 in Fig. 21 is controlled. As this second pilot gyroscope controls only a single steering gyroscope, the connections described for control of a second motor, as 35ª, need not be provided.

Through the apparatus and connections which have now been described in detail, an aircraft may be maintained in flight in a predetermined direction. In the event of deviation in any direction due to external forces, the steering and control apparatus described will immediately restore the craft to its original direction of flight.

Alteration of the course may be effected by manual displacement of the rotating gyroscope element in one of the pilot units. If the element is caused to rotate in a new and different plane, the steering gyroscopes will immediately operate to align the craft on its new course as determined by the pilot gyroscopes.

While the pilot gyroscopes may be of relatively small size to economize weight and cost, the main or steering gyroscopes, such as are shown in Fig. 1, must be of large dimensions and the rotating elements must be of substantial mass and rotate at relatively high speed in order to supply enough angular momentum to apply an effective turning force to the craft. It is also essential in light aircraft, such as rockets or rocket planes, that the weight be reduced wherever possible.

A further feature of my invention relates to the provision of hollow rotating gyroscope elements for the steering gyroscopes, which hollow elements may be filled with liquid fuel such as is used in propelling the craft. This liquid fuel confined within the hollow gyroscopes provides the necessary mass for effective flight control. As the flight continues and the regular fuel supply decreases, the fuel in the gyroscopes may be gradually withdrawn for combustion purposes.

Although the gradual loss of liquid from the gyroscopes will of course lighten the gyroscopes and hence tend to reduce their corrective action, this will not be a serious disadvantage, since a large part of the weight of the craft is in the fuel load, and by the time the fuel tanks are nearly empty the weight of the craft will have been reduced sufficiently so that even the empty gyroscopes will produce effective flight correction.

I have provided special means for withdrawing the liquid from the hollow gyroscope elements in such manner as to continuously maintain a high angular momentum of the gyroscopes as the mass of the rotating gyroscope elements is gradually decreased. This feature of my invention is disclosed in Figs. 22 to 28.

Each rotating gyroscope element is preferably made in the form of a hollow ring 160 mounted on a hollow shaft 161 by hollow spokes 162, all of which hollow elements preferably connect with each other. A filler plug 163 is provided at one point on the ring 160 and a counterbalance of equal weight is provided at 164.

Stiffening diaphragms 165 are provided at spaced intervals within the hollow ring 160 which serve to keep the liquid rotating at the same speed as the hollow ring. Each diaphragm has a notch or opening 166 at its outer edge to permit flow of liquid toward one or the other of two oppositely disposed discharge valves 170.

Each valve 170 has a rod 171 extending inward through the ring 160 and a packing 171ª and connected to a pivoted lever 172. A compression spring 173 acts on the lever 172 and rod 171 to normally maintain the valve 170 in closed position which action is assisted by centrifugal force.

Each lever 172 has a cam plate 175 (Fig. 23) mounted thereon and angularly disposed in the path of a pair of valve opening slides 176 (Fig. 25). The slides 176 are each mounted in guideways 177 secured to arms 178 (Fig. 1) extending inward from the gimbals 32 and 32ª which support the rotating gyroscope elements. Each slide 176 is provided with rack teeth engaged by a pinion 180 (Figs. 25 and 26), which pinion may be rotated by a small motor 181, the operation of which may be either manually controlled or float controlled. Movement of the slides is limited by inner and outer stops 182.

The slides 176 are mounted in pairs so positioned that the two associated slides when moved inward will simultaneously engage the cam plates 175 at opposite sides of a ring 160, thus causing simultaneous momentary opening of both valves twice during each revolution. Every time the valves are opened, a small amount of liquid is discharged through the valves 170 into rearwardly disposed caps or nozzles 183 (Figs. 22 and 23).

The caps or nozzles 183 direct the ejected fuel rearwardly relative to the tangential motion of the periphery of the hollow gyroscope element 160, so that the fuel leaves the gyroscope at much reduced peripheral speed. This causes less splashing in the fuel tank and furthermore the energy of the escaping fuel is largely transferred to the gyroscope and to the remaining fuel. This tends to speed up the gyroscope and to offset to a considerable extent the reduction in mass of the gyroscope as the fuel is allowed to escape therefrom. As equal amounts of fuel escape at opposite points on the gyroscope ring, there is no unbalanced force acting on the ring caused by the escape of fuel.

An illustrative assembly of pairs of main or steering gyroscopes in an aircraft is indicated in Fig. 27, which shows three pair of steering gyroscope elements located in three different planes and supported in any convenient manner as by light tubular frame work 190. Two steering units are shown positioned above the full fuel level indicated by the line 191, and the fuel in the rotating rings may be discharged freely into the fuel tank when the fuel level has been lowered, preferably to a predetermined point.

If it is desired to fill the fuel tank as completely as possible, the construction shown in the lower part of Fig. 27 may be provided. In this construction a steering gyroscope unit is mounted in a box-like frame 200 secured to the wall of the fuel tank by light supports 201. The frame 200 is provided with a thin flexible liquid-tight covering 202, so disposed that all sides of the container will be concave to withstand the hydrostatic pressure.

A vent pipe 203 leads from the container to the hollow space at the top of the fuel tank above the liquid level, and a vent valve 204 is provided in the side of the container, which valve is closed by the outside hydrostatic pressure when the container is submerged but opens by gravity when the fuel level drops below the container. If the fuel in the rotating gyroscope is discharged after the fuel level drops and the valve 204 opens, the discharged fuel escapes immediately through the valve 204 to the fuel tank.

By thus utilizing the rotating elements of the main or steering gyroscopes as fuel containers, these elements may be made of any desired size and of sufficient mass so that when filled they will produce any desired angular momentum and flight correcting effect.

The delayed action switch shown in detail in Figs. 13 to 20 is not claimed herein but forms the subject matter of a divisional application Serial No. 153,009, filed by me July 10, 1937.

The fuel storage and discharge apparatus shown herein and particularly in Figs. 22 to 28 is not claimed in this application but forms the subject matter of a second divisional application Serial No. 199,180, filed by me March 31, 1938.

The term "outer space" as used in this application is intended to define space beyond the normal atmosphere, where the air is substantially rarefied and the force of gravity is substantially reduced.

Having thus described my invention and the advantages thereof, I do not wish to be limited to the details herein disclosed, otherwise than as set forth in the claims, but what I claim is:

1. Apparatus for directing the flight of an aircraft in outer space which comprises a pair of associated gyroscopes mounted for precessional movement in supports which are separately rotatable in bearing structure fixed in said craft, means to rotate said gyroscopes in opposite directions and at equal speeds, and means to precessionally displace the gyroscopes equally in opposite directions, thereby causing said gyroscopes to exert a flight-adjusting force on said aircraft in space.

2. Apparatus for directing the flight of an aircraft in outer space which comprises a pair of associated gyroscopes mounted for precessional movement in supports which are separately rotatable in bearing structure fixed in said craft, means to rotate said gyroscopes in opposite directions and at equal speeds, means to precessionally displace the gyroscopes equally in opposite directions, thereby causing said gyroscopes to exert a flight-adjusting force on said aircraft in space, and a pilot gyroscope controlling the operation of said latter means.

3. Apparatus for correcting the flight of an aircraft in space which comprises a pair of associated gyroscopes mounted for precessional movement in supports which are separately rotatable in bearing structure fixed in said craft, means to rotate said gyroscopes in opposite directions and at equal speeds, a pilot gyroscope, and devices controlled thereby which include means to effect an initial precessional displacement of said steering gyroscopes equally but in opposite directions to neutralize a displacing force and to provide a flight-correcting force and means to reverse the precession of the steering gyroscopes when a part only of the required correction of flight has been accomplished.

4. Apparatus for correcting the flight of an aircraft in space which comprises a pair of associated gyroscopes mounted for precessional movement in supports which are separately rotatable in bearing structure fixed in said craft, means to rotate said gyroscopes in opposite directions and at equal speeds, a pilot gyroscope, and devices controlled thereby which include means to effect an initial precessional displacement of said steering gyroscopes equally but in opposite directions to neutralize a displacing force and to provide a flight-correcting force, means to reverse the precession of the steering gyroscopes when the flight has been in part corrected, and means to thereafter stop the reverse precession of said steering gyroscopes when said reverse precession equals a part only of the initial precession.

5. Apparatus for correcting the flight of an aircraft in space which comprises a pair of associated gyroscopes mounted for precessional movement in supports which are separately rotatable in bearing structure fixed in said craft, means to rotate said gyroscopes in opposite directions and at equal speeds, a pilot gyroscope, and devices controlled thereby which include means to effect an initial precessional displacement of said steering gyroscopes equally but in opposite directions to neutralize a displacing force and to provide a flight-correcting force, means to reverse the precession of the steering gyroscopes when the flight has been one-half corrected, and means to thereafter stop the reverse precession of said steering gyroscopes when said reverse precession equals one-half of the initial precession.

ROBERT H. GODDARD.